(12) United States Patent
Yamada

(10) Patent No.: US 11,797,238 B2
(45) Date of Patent: Oct. 24, 2023

(54) METHOD FOR SWITCHING IMAGE FORMING APPARATUS, IMAGE FORMING APPARATUS, AND INFORMATION PROCESSING APPARATUS

(71) Applicant: BROTHER KOGYO KABUSHIKI KAISHA, Nagoya (JP)

(72) Inventor: Takatsugu Yamada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/671,725

(22) Filed: Feb. 15, 2022

(65) Prior Publication Data

US 2022/0317941 A1  Oct. 6, 2022

(30) Foreign Application Priority Data

Mar. 30, 2021  (JP) ................. 2021-058775

(51) Int. Cl.
*G06F 3/12* (2006.01)

(52) U.S. Cl.
CPC .......... *G06F 3/1204* (2013.01); *G06F 3/1232* (2013.01); *G06F 3/1255* (2013.01); *G06F 3/1261* (2013.01)

(58) Field of Classification Search
None
See application file for complete search history.

(56) References Cited

U.S. PATENT DOCUMENTS

| | | | |
|---|---|---|---|
| 2018/0131831 A1 | 5/2018 | Tolia et al. | |
| 2018/0157942 A1* | 6/2018 | Nagasaki | G06K 15/402 |
| 2020/0225885 A1* | 7/2020 | Akimoto | G06Q 30/06 |
| 2020/0361216 A1* | 11/2020 | Tanaka | B41J 2/17509 |

* cited by examiner

*Primary Examiner* — Frantz Bataille
(74) *Attorney, Agent, or Firm* — Scully, Scott, Murphy & Presser, P.C.

(57) ABSTRACT

A method includes a first receiving step of causing an information processing apparatus to receive a first notification indicating that a non-contracted cartridge is mounted on the first image forming apparatus, a cancelation-executing step of causing the information processing apparatus to execute a canceling process of canceling the contract of the first image forming apparatus when the information processing apparatus receives the first notification, and a permitting step of causing the information processing apparatus to permit a second image forming apparatus to use the contracted cartridge when the information processing apparatus receives the first notification.

14 Claims, 9 Drawing Sheets

FIG.4

| USER NAME | DEVICE ID | CONTRACT | PRE-SWITCHED DEVICE |
|---|---|---|---|
| USER A | 00000001 | ALREADY STARTED | — |
| USER B | 00000002 | NOT STARTED | — |
| USER C | 00000003 | ALREADY STARTED | — |
| | 00000004 | ALREADY STARTED | — |
| USER D | 00000010 | INVALID | — |
| | 00000015 | ALREADY STARTED | — |
| USER E | 00000041 | ALREADY STARTED | 00000098 |
| USER F | 00000192 | ALREADY STARTED | 00000521 |
| | 00000521 | NOT STARTED | — |
| USER G | 00000786 | INVALID | 00000855 |
| | 00000855 | ALREADY STARTED | — |
| ... | ... | ... | ... |

FIG.6

AFTER PROCESSING OF S131 　　　　　　　　　　　　　　　/822

| USER NAME | DEVICE ID | CONTRACT | PRE-SWITCHED DEVICE |
|---|---|---|---|
| USER A | 00000001 | NOT STARTED | — |
| USER B | 00000012 | ALREADY STARTED | — |
| USER C | 00000025 | ALREADY STARTED | — |
| | 00000041 | ALREADY STARTED | — |
| ... | ... | ... | ... |

⇩

AFTER PROCESSING OF S135

| USER NAME | DEVICE ID | CONTRACT | PRE-SWITCHED DEVICE |
|---|---|---|---|
| USER A | 00000001 | ALREADY STARTED | — |
| USER B | 00000012 | ALREADY STARTED | — |
| USER C | 00000025 | ALREADY STARTED | — |
| | 00000041 | ALREADY STARTED | — |
| ... | ... | ... | ... |

FIG.9

AFTER PROCESS OF S231                                                        822

| USER NAME | DEVICE ID | CONTRACT | PRE-SWITCHED DEVICE |
|---|---|---|---|
| USER A | 00000001 | ALREADY STARTED | – |
|  | 00000002 | NOT STARTED | 00000001 |
| USER B | 00000012 | ALREADY STARTED | – |
| USER C | 00000025 | ALREADY STARTED | – |
|  | 00000041 | ALREADY STARTED | – |
| ... | ... | ... | ... |

⇩

AFTER PROCESS OF S235

| USER NAME | DEVICE ID | CONTRACT | PRE-SWITCHED DEVICE |
|---|---|---|---|
| USER A | 00000001 | INVALID | – |
|  | 00000002 | NOT STARTED | 00000001 |
| USER B | 00000012 | ALREADY STARTED | – |
| USER C | 00000025 | ALREADY STARTED | – |
|  | 00000041 | ALREADY STARTED | – |
| ... | ... | ... | ... |

⇩

AFTER PROCESS OF S239

| USER NAME | DEVICE ID | CONTRACT | PRE-SWITCHED DEVICE |
|---|---|---|---|
| USER A | 00000001 | INVALID | – |
|  | 00000002 | ALREADY STARTED | 00000001 |
| USER B | 00000012 | ALREADY STARTED | – |
| USER C | 00000025 | ALREADY STARTED | – |
|  | 00000041 | ALREADY STARTED | – |
| ... | ... | ... | ... |

METHOD FOR SWITCHING IMAGE FORMING APPARATUS, IMAGE FORMING APPARATUS, AND INFORMATION PROCESSING APPARATUS

CROSS REFERENCE TO RELATED APPLICATION

The present application claims priority from Japanese Patent Application No. 2021-058775, which was filed on Mar. 30, 2021, the disclosure of which is herein incorporated by reference in its entirety.

BACKGROUND

The following disclosure relates to a method for switching an image forming apparatus, the image forming apparatus, and an information processing apparatus.

There has been widely provided a fixed price printing service for a user of an image forming apparatus. The fixed price printing service is also called a subscription service, and each image forming apparatus can join the subscription service. For example, the image forming apparatus with which a contract related to uses of the fixed price service was concluded permits the user to print up to a predetermined number of prints in a predetermined period at the fixed-price.

Generally, in the use of the fixed price service for the image forming apparatus, there are common cases in which a provider of the fixed price service designates that the user of the fixed price service should use contracted consumables dedicated to the fixed price service. In these cases, it is necessary to establish a system which secures that use of the contracted consumable in the contracted device is an appropriate use.

To secure the appropriate use of the contracted consumables, for example, there has been known a technique to distinguish between the contracted consumables and non-contracted consumables which can be used regardless of joining the service. Moreover, there has been known a technique to manage to associate the contracted consumables with the contracted device such that the contracted consumables are used for the identified contracted device.

SUMMARY

Incidentally, the user can switch the contracted device to another device for various circumstances. Previously, switching of the contracted device is conducted as follows. For example, first, a procedure of cancelation of the contract with respect to a pre-switched image forming apparatus (which may be hereinafter referred to as "pre-switched device") is conducted. Second, another image forming apparatus (which may be hereinafter referred to as "post-switched device") is delivered to the user. Third, a new contract to the post-switched device is concluded. Fourth, the provider of the service provides the user with contracted consumables for the post-switched device based on the concluded contract of the post-switched device. That is, the user has to conduct procedures himself to cancel the contract for the pre-switched device, accordingly, it makes some works.

An aspect of the disclosure relates to achieving a method for reducing works of a user to cancel a contract of a contracted device.

In one aspect of the disclosure, a method includes a first receiving step of causing an information processing apparatus to receive, from a first image forming apparatus, a first notification indicating that a non-contracted cartridge other than a contracted cartridge is mounted on the first image forming apparatus which is permitted to use the contracted cartridge that can be used based on a concluded contract, a cancelation-executing step of causing the information processing apparatus to execute a canceling process of canceling the contract of the first image forming apparatus when the information processing apparatus receives the first notification, and a permitting step of causing the information processing apparatus to permit a second image forming apparatus corresponding to the first image forming apparatus to use the contracted cartridge when the information processing apparatus receives the first notification.

In another aspect of the disclosure, an image forming apparatus permitted to use a contracted cartridge includes a body housing, and a controller configured to execute, a determining process of determining whether a cartridge mounted on the body housing is a non-contracted cartridge other than the contracted cartridge, a transmitting process of transmitting, to an information processing apparatus, a notification indicating that mounting of the non-contracted cartridge on the first image forming apparatus and permitting a second image forming apparatus corresponding to the first image forming apparatus to use the contracted cartridge, when the cartridge mounted on the first image forming apparatus is the non-contracted cartridge, a receiving process of receiving a cancelation notification, in response to the notification, indicating a cancelation of the contract of the first image forming apparatus, and a prohibiting process of prohibiting the first image forming apparatus from using the contracted cartridge when the first image forming apparatus receives the cancelation notification.

In another aspect of the disclosure, an information processing apparatus is configured to communicate with a first image forming apparatus which is permitted to use a contracted cartridge that can be used based on a concluded contract and a second image forming apparatus corresponding to the first image forming apparatus. The information processing apparatus includes a controller configured to execute a first receiving process of receiving a first notification indicating a non-contracted cartridge other than the contracted cartridge is mounted on the first image forming apparatus, a cancelation-executing process of executing a cancelation process of canceling the contract of the first image forming apparatus when the information processing apparatus receives the first notification, and a permitting process of permitting the second image forming apparatus to use the contracted cartridge when the information processing apparatus receives the first notification.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 4 is a diagram illustrating an example of a data structure of a registration table according to the first embodiment of the present disclosure;

FIG. 6 is a diagram illustrating a transition of information in the registration table in FIG. 5;

FIG. 9 is a diagram illustrating a transition of information in the registration table in FIG. 8;

EMBODIMENTS

First Embodiment

There will be described below embodiments of the present disclosure in detail with reference to FIG. 1 to FIG. 9. In the embodiment, as an example, there will be described a case in which an image forming apparatus is an ink-jet printer.

Outline of Image Forming System

Figure 1:
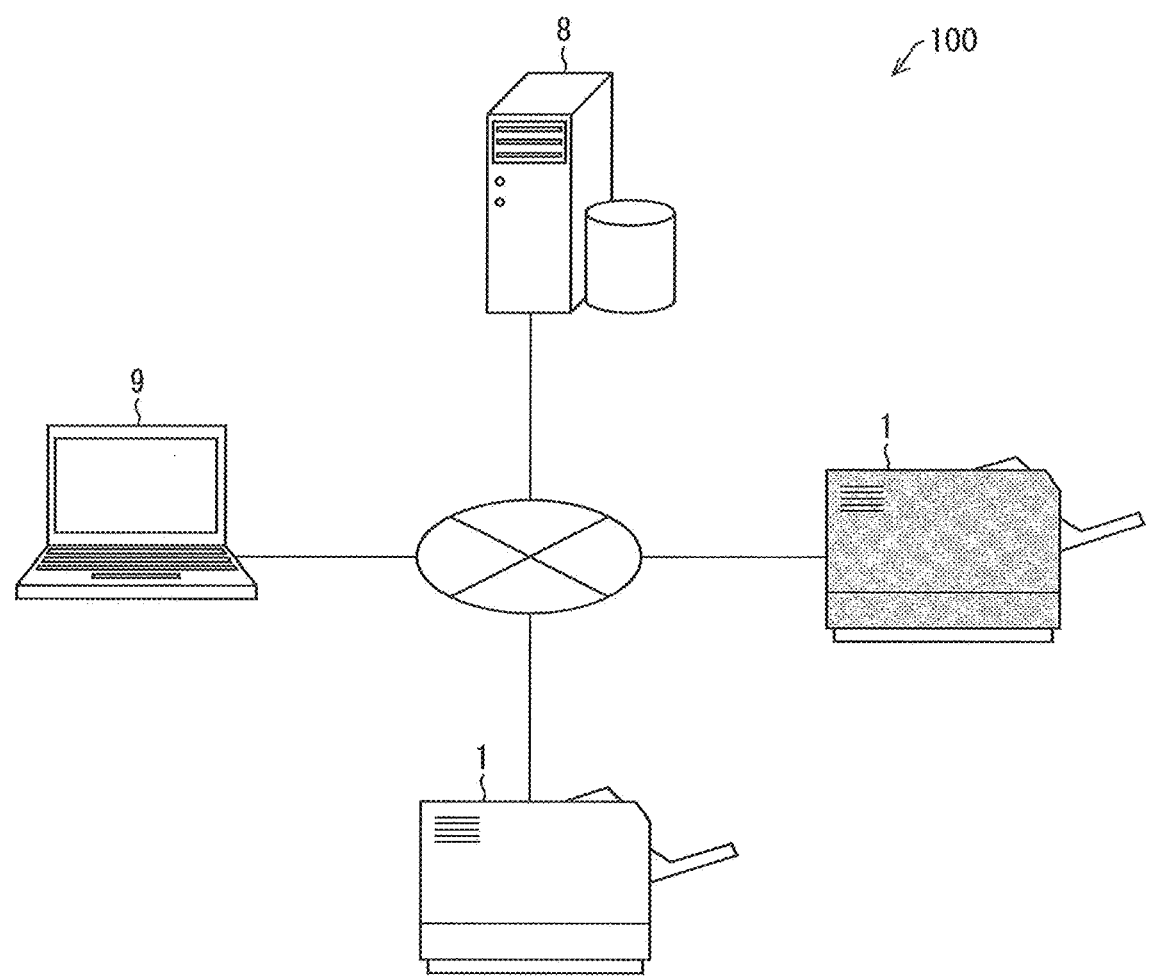
FIG. 1 is a schematic view illustrating an image forming system according to a first embodiment of the present disclosure.

FIG. 1 is a view illustrating an outline of an image forming system 100 according to a first embodiment of the present disclosure. In the image forming system 100, a printing service is provided, with respect to the image forming apparatus 1 of a user, from a provider based on a contract concluded between the provider and the user of the image forming apparatus 1. Hereinafter, a fixed price printing service provided based on the contract will be referred to as a contracted service. Moreover, printing executed by the image forming apparatus 1 by using the provided contracted service will be referred to as contracted printing, which is distinguished from printing executed normally and does not relate to the contract. The printing executed normally and does not relate to the contract will be referred to as normal printing.

As illustrated in FIG. 1, the image forming system 100 is configured to include a plurality of image forming apparatuses 1, a server 8 (as an example of an information processing apparatus), and a user terminal 9. The image forming apparatus 1 used by a user is a device that uses the contracted service to execute printing. The server 8 used by the provider of the contracted printing is a device that manages the image forming apparatus 1 with which the contract was concluded and permitted to use the contracted service. Hereinafter, the image forming apparatus 1 with which the contract was concluded and permitted to use the contracted service will be referred to as a contracted device. The user terminal 9 used by the user is a device that executes conclusion of the contract, cancelation of the contract, and other procedures by communicating with the server 8. For example, an information processing terminal with a standard communication function, such as a PC (a Personal Computer) and a smart phone, can be adopted as the user terminal 9. Each of the devices constituting the image forming system 100 can communicate with one another via a communication network such as the Internet.

The plurality of image forming apparatuses 1 illustrated in FIG. 1 represent the image forming apparatuses 1 bought by the same user. Though not illustrated in FIG. 1, the image forming system 100 may be configured to include another image forming apparatus bought by another user.

Each of the plurality of image forming apparatuses 1 is an image forming apparatus permitted to use consumables or exchange parts dedicated to the contract when the user concludes the contract with the provider of the contracted printing. The contract means that, as an example, an agreement in which the provider provides the contracted service with the user is agreed by the provider that provides the contracted service and the user, under an agreement in which a period of the contracted service, a subscription fee of the contracted service, an upper limit of the number of prints and the like are agreed by the user and the provider. That is, the image forming apparatus 1 of the present embodiment is an image forming apparatus that is allowed to execute the contracted printing which is printing based on the content of the contracted service after conclusion of the contract.

In the image forming system 100, a timing A and a timing B, each of which will be described below, may be different from each other in the contracted service provided from the provider to the user.

The timing A is a timing when the server 8 identifies the image forming apparatus 1 as the contracted device with which the contract was concluded. The timing B is a timing when the server 8 identifies that the contracted service is started to use in the image forming apparatus 1. That is, in the contracted service, there is a possibility that the server 8 identifies that the server 8 identifies the image forming apparatus 1 that is the contracted device and has not started the contracted service to use.

It is noted that identifying the image forming apparatus 1 has started to use the contracted service at the timing B means that the server 8 identifies that the contracted service has been started in the image forming apparatus 1 since certain timing. Accordingly, the timing when the server 8 identifies that the contracted service has been started to use in the image forming apparatus 1 may be different from a timing when the image forming apparatus 1 actually started to execute the contracted printing.

In the following description, unless there is a special description, the contracted service is a pay service. The timing A is not a timing triggering a start of charging of the concluded contract of the image forming apparatus 1, and the timing B is the timing of start of charging.

In the following description, a cartridge used for the contracted printing that is an ink cartridge dedicated to the contracted service will be referred as a contracted cartridge. In other words, the contracted cartridge is an ink cartridge 4 that can be used based on the concluded contract.

In the present embodiment, as an example, there will be described that the image forming apparatus 1 is an ink-jet printer configured to eject ink (printing materials) to print data on the recording sheet. One or more ink cartridges are mounted on a body housing of the image forming apparatus 1. In the present embodiment, the image forming apparatus 1 is a color printer on which a plurality of ink cartridges respectively containing ink of a plurality of colors can be mounted. More specifically, in the present embodiment, the plurality of cartridges containing ink of four colors, cyan (C), magenta (M), yellow (M) and black (B), are mounted on the image forming apparatus 1. It is noted that a display, such as a liquid crystal display and a lamp, and an input unit, such as buttons, which are not illustrated, may be provided for the image forming apparatus 1. Moreover, the liquid crystal display integrated with a touch panel may be configured to function as the input unit.

Though there will be described in details below, the user using the image forming system 100 can conduct a switch of the contract. The switch of the contract in the present embodiment indicates that the concluded contact with a certain image forming apparatus 1 is canceled, and a contract with another image forming apparatus 1 is concluded. It is noted that a cancelation of the contract in the present embodiment indicates that the server 8 does not identify the image forming apparatus 1 as the contracted device.

That is, the switch of the contract can be said that switching the contracted device from the certain image forming apparatus 1 to said another image forming apparatus 1. In the following description, the image forming apparatus 1 that is a current-contracted device will be referred as a pre-switched image forming apparatus 1 (an example of a first image forming apparatus). Moreover, the image forming apparatus 1 that is another image forming apparatus 1 with which the contract is newly concluded in place of the pre-switched image forming apparatus 1 will be referred as a post-switched image forming apparatus 1 (an example of a second image forming apparatus).

Moreover, the user can conclude a new contract. The new contract in the present embodiment means that a new contract is concluded for a certain image forming apparatus 1 without setting another image forming apparatus 1 that is switched from the certain image forming apparatus 1 to said another image forming apparatus 1 as the contracted device. That is, the new contract means increasing a new contracted device registered in the server 8. Moreover, the user can cancel the contract of a certain image forming apparatus 1 without setting another image forming apparatus 1 that is switched from the certain image forming apparatus 1 to said another image forming apparatus.

Configuration of Image Forming Apparatus

Figure 2:
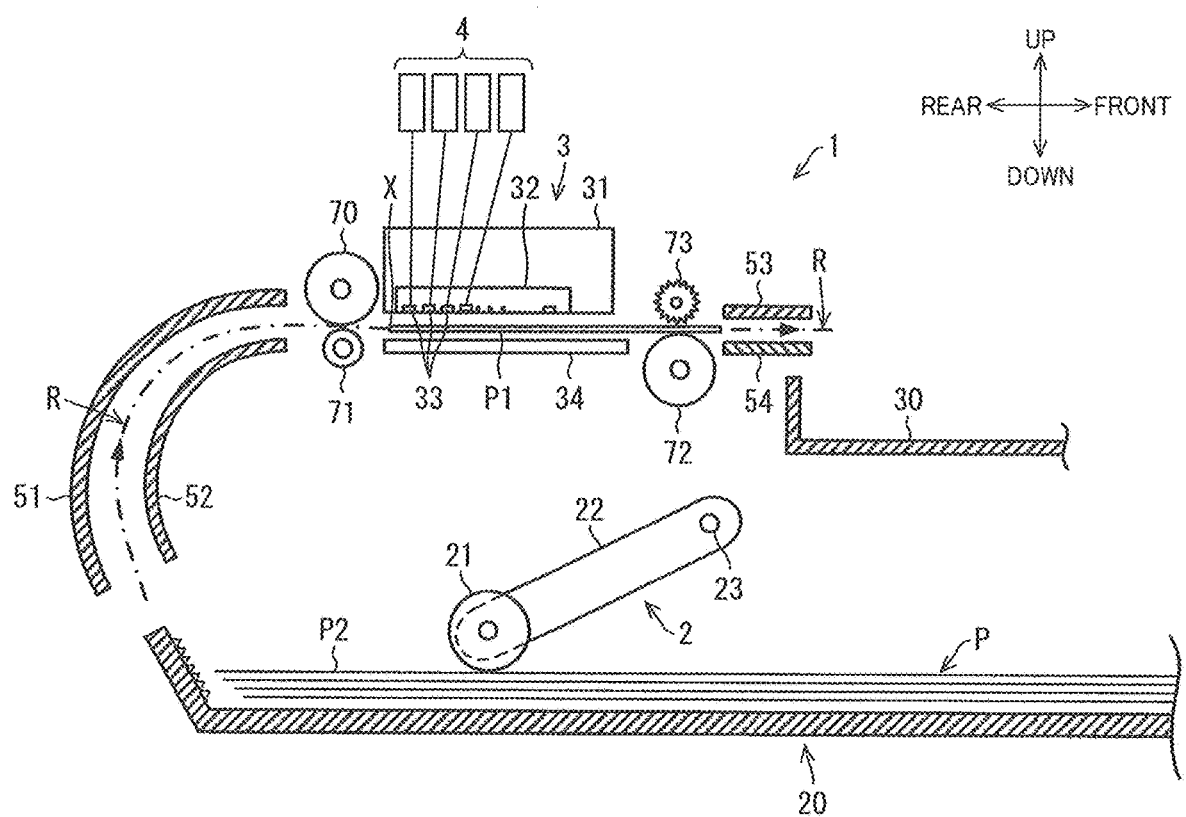
FIG. 2 is a schematic view illustrating a configuration of an image forming apparatus according to the first embodiment of the present disclosure.

FIG. 2 is a view illustrating an overall configuration of the image forming apparatus 1 in the present embodiment. For convenience, in the following description, an upper side in FIG. 2 is defined as an upper side of the image forming apparatus 1, a lower side in FIG. 2 is defined as a lower side of the image forming apparatus 1, a left side in FIG. 2 is defined as a rear side of the image forming apparatus 1, and a right side in FIG. 2 is defined as a front side of the image forming apparatus 1.

The image forming apparatus 1 is an ink-jet printer configured to print data on a recording sheet P by ejecting ink. One or more ink cartridges are mounted on the body housing of the image forming apparatus 1. In an example in FIG. 2, the image forming apparatus 1 can print when the four cartridges 4 are mounted on the image forming apparatus 1.

The image forming apparatus 1 may include an opening through which the ink cartridges 4 are mounted on the body housing of the image forming apparatus 1. Moreover, the image forming apparatus 1 may include a cover configured to close the opening through which the ink cartridges 4 are mounted on. The cover is configured so as to be movable between an open position at which the cover opens the opening and a close position at which the cover closes the opening.

It is noted that, other than parts illustrated in FIG. 2, a display, such as a liquid crystal display and a lamp, and an input unit, such as buttons may be provided for the image forming apparatus 1. Moreover, the liquid crystal display integrated with a touch panel may be configured to function as the input unit.

In the embodiment illustrated in FIG. 2, the image forming apparatus 1 includes a supply tray 20, a supplier 2, a conveying roller 70, a recorder 3, a discharging roller 72, and a discharge tray 30. An opening is formed on a front surface of the image forming apparatus 1. The supply tray 20 is disposed at the opening so as to be movable in a front and rear direction. A plurality of recording sheets P stacked on one another are accommodated in the supply tray 20. The recording sheet P is, for example, a paper sheet having a predetermined size.

The supplier 2 includes a supplying roller 21, a supply arm 22 and a shaft 23. The supplier 2 supplies the recording sheet P accommodated in the supply tray 20 to a conveyance path R by rotation of the supplying roller 21 in a clockwise direction. The supplying roller 21 is rotatably provided at a distal end of the supply arm 22. The supply arm 22 is rotatably provided at the shaft 23 supported by a frame of the image forming apparatus 1. The supply arm 22 is rotationally urged toward the supply tray 20 by own weight or an elastic force by a spring and the like. Driving force by rotation of a motor (which is not illustrated) provided for the image forming apparatus 1 in a counterclockwise direction is transmitted to the supplying roller 21 such that the supplying roller 21 rotates in the clockwise direction.

The conveyance path R is a path defined by a guide member 51, a guide member 52, the recorder 3, a guide member 53, a guide member 54 and the like.

The conveying roller 70 is disposed upstream of the recorder 3 in the conveying direction. A pinch roller 71 is disposed so as to be opposed to a lower portion of the conveying roller 70. The conveying roller 70 rotates by driving force of the motor of the image forming apparatus 1. The pinch roller 71 rotates by rotation of the conveying roller 70. The recording sheet P is conveyed to an image recording position X of the conveyance path R by rotations of the conveying roller 70 and the pinch roller 71 in the clockwise direction in a state in which the recording sheet P is nipped between the conveying roller 70 and the pinch roller 71. The image recording position X is a position at which recording of an image on the recording sheet P by a recording head 32 is executed. When driving force by rotation of the motor of the image forming apparatus 1 in the in the clockwise direction is transmitted to the conveying roller 70, the conveying roller 70 rotates in the clockwise direction. Moreover, when driving force by rotation of the motor in the counterclockwise direction is transmitted to the conveying roller 70, the conveying roller 70 rotates in the counterclockwise direction. It is noted that rotation of the motor provided for the image forming apparatus 1 in the clockwise direction corresponds to a rotation in a first direction, and rotation of the motor in the counterclockwise direction corresponds to rotation in a second direction.

The recorder 3 is disposed between the conveying roller 70 of the conveyance path R and the discharging roller 72. The recorder 3 includes a carriage 31, the recording head 32, a plurality of nozzles 33, and a platen 34. Moreover, the plurality of nozzles 33 are connected to each of the ink cartridges 4. It is noted that the number of the plurality of nozzles 33 and the number of the ink cartridges 4 are not limited to the number of the present embodiment.

Each of the ink cartridges 4 includes a cartridge housing. The cartridge housing is mountable on the body housing of the image forming apparatus 1. The ink cartridges 4 accommodate ink of, for example, cyan, magenta, yellow, and black, different from one another, as materials used when forming images. Ink is consumables consumed in each printing.

The carriage 31 reciprocates in a direction orthogonal to the conveying direction, that is, a width direction of the recording sheet P. In image recording on the recording sheet P, as a printing process, the image forming apparatus 1 ejects ink from the plurality of nozzles 33 of the recording head 32 so as to record an image corresponding to one line by moving the carriage 31 in the width direction of the recording sheet P in a state in which conveyance of the recording sheet P is stopped. Moreover, as a new-line process, the image forming apparatus 1 conveys the recording sheet P by a predetermined conveyance amount by driving the conveying roller 70 and the discharging roller 72. The image forming apparatus 1 repeats the recording process and the new-line process.

As illustrated in FIG. 2, the recording head 32 is mounted on the carriage 31. The plurality of nozzles 33 are provided on a lower surface of the recording head 32. The recording head 32 ejects ink droplets from the plurality of nozzles 33. The platen 34 is a plate-like member having a rectangular shape on which the recording sheet P is placed. In a process in which the carriage 31 moves with respect to the recording sheet P supported by the platen 34, an image is recorded on the recording sheet P by selective ejections of ink by the recording head 32.

The discharging roller 72 is disposed downstream of the recorder 3 in the conveying direction. A spur 73 is disposed at a position opposed to an upper part of the discharging roller 72. The discharging roller 72 is driven by the motor provided for the image forming apparatus 1. The spur 73 rotates by rotation of the discharging roller 72. The recording sheet P is discharged to the discharge tray 30 in a state in which the sheet P is nipped between the discharging roller 72 and the spur 73 by rotation of the discharging roller 72 and the spur 73 in the clockwise direction.

The discharge tray 30 is disposed above the supply tray 20. The discharge tray 30 supports the recording sheet P discharged by the discharging roller 72.

Figure 3:
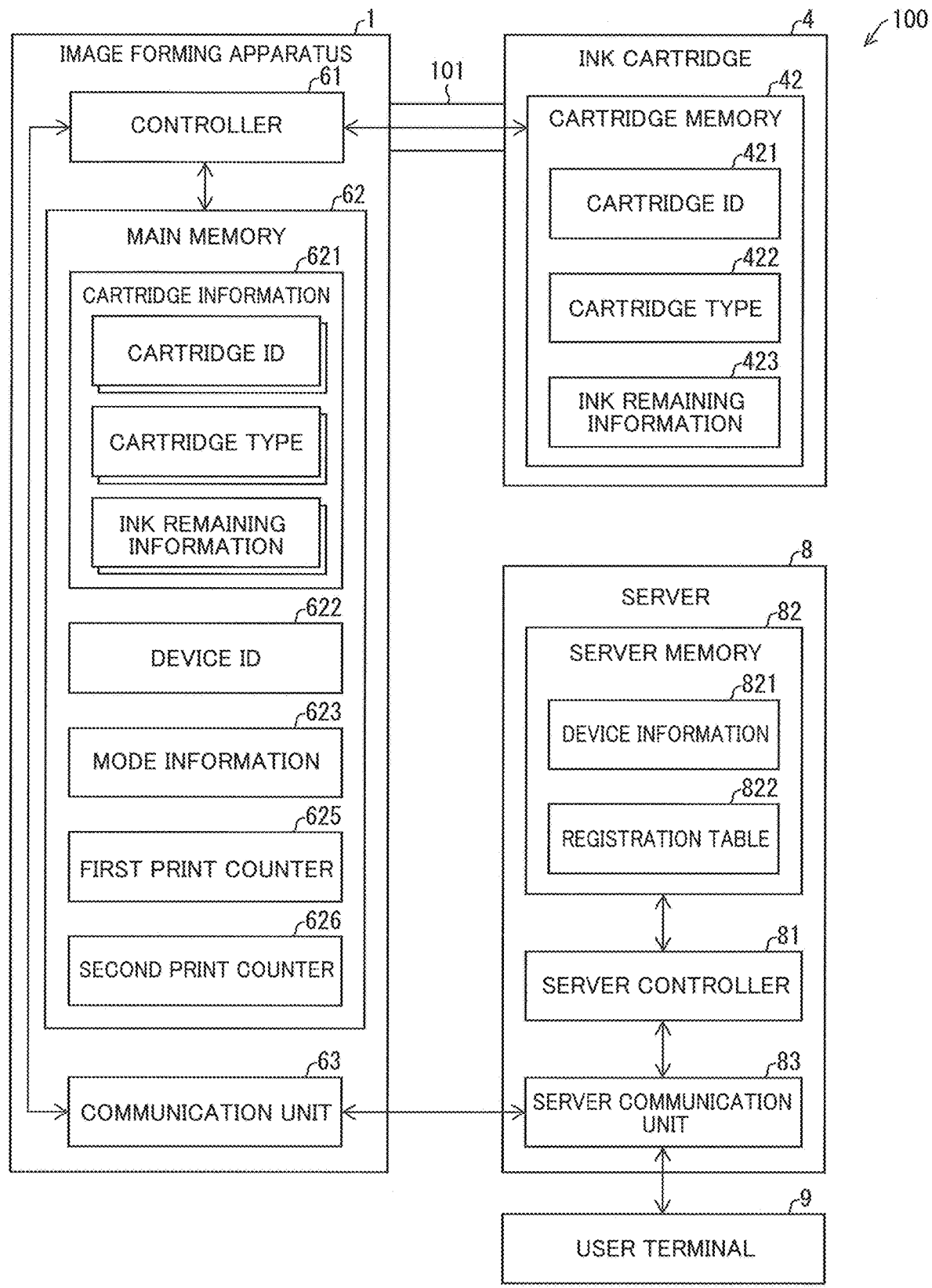
FIG. 3 is a block diagram illustrating essential parts of the image forming apparatus included in the image forming system according to the first embodiment of the present disclosure.

Configurations of Essential Part of Apparatuses Included in Image Forming System FIG. 3 is a block diagram illustrating configurations of essential parts of apparatuses included in the image forming system 100. It is noted that, in FIG. 3, the essential parts of only one of the plurality of the apparatuses are illustrated. However, each of the image forming apparatuses 1 included in the image forming system 100 includes configurations, which will be described below.

Ink Cartridge

Each of the ink cartridges 4 includes a cartridge memory 42. The cartridge memory 42 is a memory from which information is readable from and to which information is writable. The cartridge memory 42 is, for example, a flash ROM (Read Only Memory) or an EEPROM (Electrically Erasable Programmable ROM). The EEPROM is a registered trademark.

The cartridge memory 42 stores various information regarding the ink cartridge 4. The cartridge memory 42 stores, for example, a cartridge ID 421, a cartridge type 422, and ink remaining-amount information 423.

The cartridge ID 421 is identification information for identifying the ink cartridge 4 uniquely. The cartridge ID 421 is, for example, serial numbers individually allocated to the ink cartridges 4 respectively. The cartridge ID 421 may include the color, the model number, the manufacture, and the production lot of the ink cartridge 4, and the like.

The cartridge type 422 is information indicating a type of the ink cartridge 4. In the present embodiment, at least two types, "contracted" and "commercial" can be set as the types of the ink cartridge 4. The ink cartridge 4 which is the "commercial" type is an example of a non-contracted cartridge.

The ink cartridge 4 indicated by the cartridge type 422 as the type "contracted" is an ink cartridge 4 dedicated to the contracted service, that is the contracted cartridge. The image forming apparatus 1 can execute the contracted printing while being mounted the contracted cartridge on the image forming apparatus 1. The contracted cartridge is provided from the provider to the user who concludes the contract to the image forming apparatus 1.

The ink cartridge 4 indicated by the cartridge type 422 as the type "commercial" is an ink cartridge 4 that can be used in normal printing. As described above, the normal printing is printing which is executed normally and does not relate to the contract. Accordingly, the cartridge 4 indicating the type "commercial" can be used regardless of whether the contract was concluded or not. In the following description, the ink cartridge 4 indicating the type "commercial" will be referred as the commercial cartridge.

The commercial cartridge may be the commercial ink cartridge 4 purchasable at a mass home electrical retailer or a mail order site. The commercial cartridge may be, what is called, a genuine product manufactured by the manufacturer of the image forming apparatus 1, and may be a compatible product, i.e., a third product, manufactured by a third party other than the manufacture of the image forming apparatus 1.

The ink remaining-amount information 423 is information indicating a remaining amount of ink of the ink cartridge 4. The remaining amount of ink is stored as, for example, values respectively corresponding to a plurality of stage from full of ink to empty. Respective stages of the remaining amount of ink may be notified by words of "FULL" to "EMPTY" to the user, may be notified by numerals of "100%" to "0%" to the user, and may be notified by expressions combining the words and the numerals to the user.

It is noted that the cartridge memory 42 may store information indicating whether the ink cartridge 4 is a new cartridge or an old cartridge in addition to the above described various information. Moreover, the cartridge memory 42 may store a device ID of the image forming apparatus 1 on which the ink cartridge 4 containing the cartridge memory 42 storing the device ID is mounted.

Image Forming Apparatus

The image forming apparatus 1 includes the controller 61, a main memory 62 and a communication unit 63. The controller 61 includes, for example, ASIC (Application Specific Integrated Circuit). The controller 61 is electrically connected to the main memory 62 provided at the body housing of the image forming apparatus 1 and the communication unit 63. The controller 61 causes the image forming apparatus 1 to execute various processes relating to printing by executing various operations.

It is noted that the controller 61 may include a processor such as a CPU (Central Processing Unit). In this case, a controlling program configured to execute a controlling method of the image forming apparatus 1 is stored into the main memory 62, and the controller 61 may cause the image forming apparatus 1 to execute various processes by operations of the processor in accordance with the controlling program.

Moreover, the controller 61 may include a recording medium, such as the main memory 62, storing the controlling program and readable by a computer. As the recording medium, a tangible non-transitory medium, for example, a ROM, a tape, a disk, a card, a semiconductor memory, a programable logic circuit, and the like can be used. Moreover, a RAM (Random Access Memory) which expands the controlling program may be used. The controlling program may be provided to the computer via arbitrary transmission media capable of transmitting the controlling program (such as a communication network and a broadcast wave). It is noted that one embodiment of the present disclosure can be achieved as a form of data signals in which the controlling program is embodied and embedded in a carrier wave.

The body housing of the image forming apparatus 1 includes a connector 101. When the ink cartridge 4 is mounted on the body housing of the image forming apparatus 1, the connector 101 is electrically connected to the cartridge memory 42. As a result, the controller 61 of the image forming apparatus 1 can communicate with the cartridge memory 42 of the ink cartridge 4. Accordingly, the controller 61 becomes executable for a reading process of reading information from the cartridge memory 42 and a writing process (including a rewriting process) of writing information into the cartridge memory 42.

The main memory 62 is a memory from which information is readable and to which information is writable. The main memory 62 is, for example, a flash ROM or an EEPROM. The EEPROM is a registered trademark. The main memory 62 includes one or more storage areas, and, as an example, various kinds of information described below are stored in each of the one or more storage areas.

Cartridge information 621 is information related to each of the ink cartridges 4 of each color mounted on the image forming apparatus 1. Specifically, the cartridge information 621 includes information read from the cartridge memory 42 of each of the ink cartridges 4 and associated with a corresponding one of the ink cartridges 4. As illustrated, the information related to the ink cartridge 4 is, as an example, a cartridge ID, a cartridge type, the remaining amount of ink, and the like.

In the present embodiment, the controller 61 reads the cartridge ID 421, the cartridge type 422 and the ink remaining-amount information 423 from the cartridge memory 42 at a predetermined timing. Then, the controller 61 stores the cartridge ID 421, the cartridge type 422 and the ink remaining-amount information 423 as the cartridge information 621 into the main memory 62 for each of the cartridges 4.

In the present embodiment, the cartridge information 621 may be referred so as to determine by the controller 61 whether switching of a mode of the image forming apparatus 1 is proper or not in accordance with a mount-status of each of the ink cartridges 4 on the image forming apparatus 1. The mode of the image forming apparatus 1 is one of operation modes of the image forming apparatus 1 in which types of printing and the like that can be used in the image forming apparatus 1 are set.

A device ID 622 is identification information for identifying the image forming apparatus 1. The device ID 622 is, for example, a serial number of the image forming apparatus 1.

Mode information 623 is information indicating the operation mode of the image forming apparatus 1. In the present embodiment, as an example, two modes "the contracted mode" and "the not-contracted mode" are defined.

"The contracted mode" is a mode in which the image forming apparatus 1 operates in a state in which the image forming apparatus 1 is identified as the contracted device by the server 8. The image forming apparatus 1 in the contracted mode can execute the contracted printing and the normal printing. That is, the image forming apparatus 1 in the contracted mode can use both the contracted cartridge and the commercial cartridge. In other words, the image forming apparatus 1 in the contracted mode can be said the image forming apparatus 1 which is permitted to use the contracted cartridge.

On the other hand, "The not-contracted mode" is a mode in which the image forming apparatus 1 operates in a state in which the image forming apparatus 1 is not identified as the contracted device by the server 8 and the contract was not concluded. The image forming apparatus 1 in the not-contracted mode can execute the normal printing, but cannot execute the contracted printing. That is, the image forming apparatus 1 in the not-contracted mode can use the commercial cartridge, but cannot use the contracted cartridge. In other words, the image forming apparatus 1 in the not-contracted mode can be said the image forming apparatus 1 which is not permitted to use the contracted cartridge.

In the shipping of the image forming apparatus 1, the mode information 623 indicating a value corresponding to the not-contracted mode as a default setting is stored in the main memory 62. The server 8 instructs the information forming apparatus 1 with which the contract is concluded to switch to the contracted mode. The controller 61 switches the mode information 623 from the not-contracted mode to the contracted mode in accordance with the instruction from the server 8. In the present embodiment, as an example, switching the value of the mode information 623 from the not-contracted mode to the contracted mode by the controller 61 is referred to as "switching of the mode of the image forming apparatus 1".

A first print counter 625 is the total number of prints in the image forming apparatus 1. A second print counter 626 indicates the number of prints printed in the contracted printing in the image forming apparatus 1. The second print counter 626 may be count-reset to zero each time when the image forming apparatus 1 is switched from the not-contracted mode to the contracted mode, and may be the total number of prints printed in the contracted printing in the image forming apparatus 1 until now. In the following description, unless there is a specific description, the value of the second print counter 626 is the total number of prints printed in the image forming apparatus 1 that is executed as the contracted printing until now.

The communication unit 63 is a communication interface configured to execute communication between the image forming apparatus 1 and the server 8. The communication unit 63 communicates with the server 8 via, for example, a communication network such as Internet. The communication unit 63 outputs various requests, instructions, and inquiries received from the server 8 to the controller 61. The controller 61 creates responses to the requests, the instructions and the inquiries, and outputs the responses to the communication unit 63. The communication unit 63 transmits the responses which are input from the controller 61 to the server 8.

It is noted that the controller 61 may not transmit the responses to the server 8 in accordance with contents of the requests, the instructions and the inquiries. For example, in a case where the request from the server 8 is an instruction for changing various settings in the image forming apparatus 1, the controller 61 changes the various settings in the image forming apparatus 1 in accordance with the instruction. However, the controller 61 may return, to the server 8, a notification indicating that the various settings have been changed, or the controller 61 may not return the notification.

Server

The server 8 is a managing device configured to manage an operating status of the image forming apparatus 1. The server 8 includes a server communication unit 83, a server memory 82 (a storage), and a server controller 81.

The server memory 82 is a storage device storing data necessary for operations of the server 8. The server memory 82 stores, as an example, a device information 821 and a registration table 822 (contract-relating information). The device information 821 is data organizing various information related to the image forming apparatus 1. The device information 821 is stored for each of the image forming apparatuses 1. The device information 821 includes at least the device ID 622 for each of the image forming apparatuses 1. The device information 821 may include a value of the first print counter 625 and/or a value of the second print counter 626.

The server communication unit 83 is a communication interface configured to communicate between the server 8 and the image forming apparatus 1. The server communication unit 83 outputs various data, notifications, and requests received from the image forming apparatus 1 to the server controller 81. The server communication unit 83 transmits various data, notifications, and requests which are input from the server controller 81 to the image forming apparatus 1. For example, the server communication unit 83 may receive the device ID 622, the value of the first print counter 625, and/or the value of the second print counter 626 from the image forming apparatus 1, and may output the device ID 622, the value of the first print counter 625, and/or the value of the second print counter 626 to the server controller 81.

The server controller 81 is a CPU (Central Processing Unit) configured to comprehensively control the server 8. The server controller 81 executes various processes in accordance with the notifications or the requests received from the image forming apparatus. For example, the server controller 81 renews the registration table 822 stored in the server memory 82. The registration table is a data table in which the image forming apparatuses 1 to which the user designates as the contracted device are registered. Moreover, the registration table is also a data table indicating an applied status of the contracted service of each of the contracted devices. The specific configurations of the registration table 822 will be described in details below.

It is noted that the registration table 822 may be stored in, for example, a data server, which is a device different from the server 8, not in the server memory 82. In this case, the server 8 may be capable of accessing the registration table 822 by communicating with the device storing the registration table 822 via the server communication unit 83. Alternatively, in this case, the server 8 may indirectly renew the information of the registration table 822 by instructing another information processing apparatus to conduct data operations for the registration table 822.

Moreover, the server controller 81 may store, into the server memory 82, the device ID 622 which is input via the server communication unit 83 and the value of the first print counter 625 and/or the value of the second print counter 626 which are associated with each other as the device information 821 of the image forming apparatus 1.

User Terminal

The user terminal 9 includes an input interface for receiving various input operations of the user and a communication interface for communicating with the server 8.

The user terminal 9 receives the input operations for concluding a new contract. For example, the user inputs or designates an identification information of the user (a user ID) and identification information of the image forming apparatus 1, which will be a contracted device, via the input interface of the user terminal 9. When the user terminal 9 receives the input, the user terminal 9 transmits an instruction for a new contract including the information input by the user to the server 8.

Moreover, the user terminal 9 receives input operations for switching the contract. For example, the user designates or inputs identification information of the user, identification information of the image forming apparatus 1 which is the pre-switched device, and identification information of the image forming apparatus 1 which is the post-switched device via the input interface of the user terminal 9. When the user terminal 9 receives the input, the user terminal 9 transmits an instruction for switching the contract including the information input by the user to the server 8.

It is noted that the user terminal 9 may receive input operations for canceling the contract other than the operations for concluding the new contract and the operations for switching the contract input by the user. The input operations for canceling the contract includes operations to input identification information of the user and identification information of the image forming apparatus 1, the contract of which will be canceled. In a case where the user terminal 9 receives the input operations for canceling the contract, the user terminal 9 transmits an instruction for canceling the contract including the information input by the user to the server 8. The server controller 81 cancels the contract of the image forming apparatus 1 by renewing the registration table 822 in accordance with the instruction for canceling the contract.

Registration Table

FIG. 4 is a diagram illustrating an example of a data structure of the registration table 822. The registration table 822 stores, as one record, which will be described below, data corresponding to a plurality of pieces of information of (1) to (4) which are associated with one another. It is noted that the information of (4) related to the image forming apparatus 1 with which the new contract was concluded may not be included in the record.

Information of (1) is the identification information of the user. Information (2) is identification information of the image forming apparatus 1 which has been registered as the contracted device by the user who is identified by the identification information of the information (1). Information (3) is a current applied-status of the contracted service of the image forming apparatus 1 identified by the identification information of the information (2). Information (4) is identification information of the image forming apparatus 1, the contract of which will be canceled (that is, the image forming apparatus 1 which is the pre-switched device), when the image forming apparatus 1 identified by the identification information of the information (2) is switched to the contracted device. In the present embodiment, the current applied-status of the contracted service is classified into three statuses, a status in which the contracted service is not started, a status in which the contracted service has been started, and a status in which the contracted service is invalid. The status in which the contracted service is not started indicates a status in which the image forming apparatus 1 has been registered in the registration table 822, however, the contracted service is not started, that is, the information forming apparatus 1 is not started to be charged. The status in which the contracted service has been started is a status in which the contracted service has been started, that is, the image forming apparatus 1 has been started to be charged. The status in which the contracted service is invalid is a status in which the contract was canceled.

In an example in FIG. 4, information indicating the user name is stored in a column of "USER NAME" as the information (1). Moreover, in the example in FIG. 4, the device ID 622 of the image forming apparatus 1 is stored in a column of "DEVICE ID" as the information (2). Moreover, in the example in FIG. 4, information indicating one of the three status, "not started", "already started" and "invalid" in a column of "CONTRACT" as the information (3). The status "not started" indicates that the contracted service of the image forming apparatus 1 is not started. The status "already started" indicates that the contracted service the image forming apparatus 1 has already been started. The status "invalid" indicates that the contracted service of the image forming apparatus 1 is invalid. It is noted that, for convenience, information in the column of "CONTRACT" in FIG. 4 are character strings, however, the information in the column of "CONTRACT" may be numerical values. Moreover, in the example in FIG. 4, the device ID 622 of the image forming apparatus 1 which is the pre-switched device is stored in a column of "PRE-SWITCHED DEVICE" as the information (4).

According to this, the registration table 822 is a data table configured for managing the contracted devices registered by the conclusion of the new contract and the switch of the contract. Especially, the record registered by the switch of the contract is information associating the image forming apparatus 1 which is the pre-switched device with the image forming apparatus 1 which is the post-switched device.

Flow of Processes
Contract Process of New Registration

Figure 5:
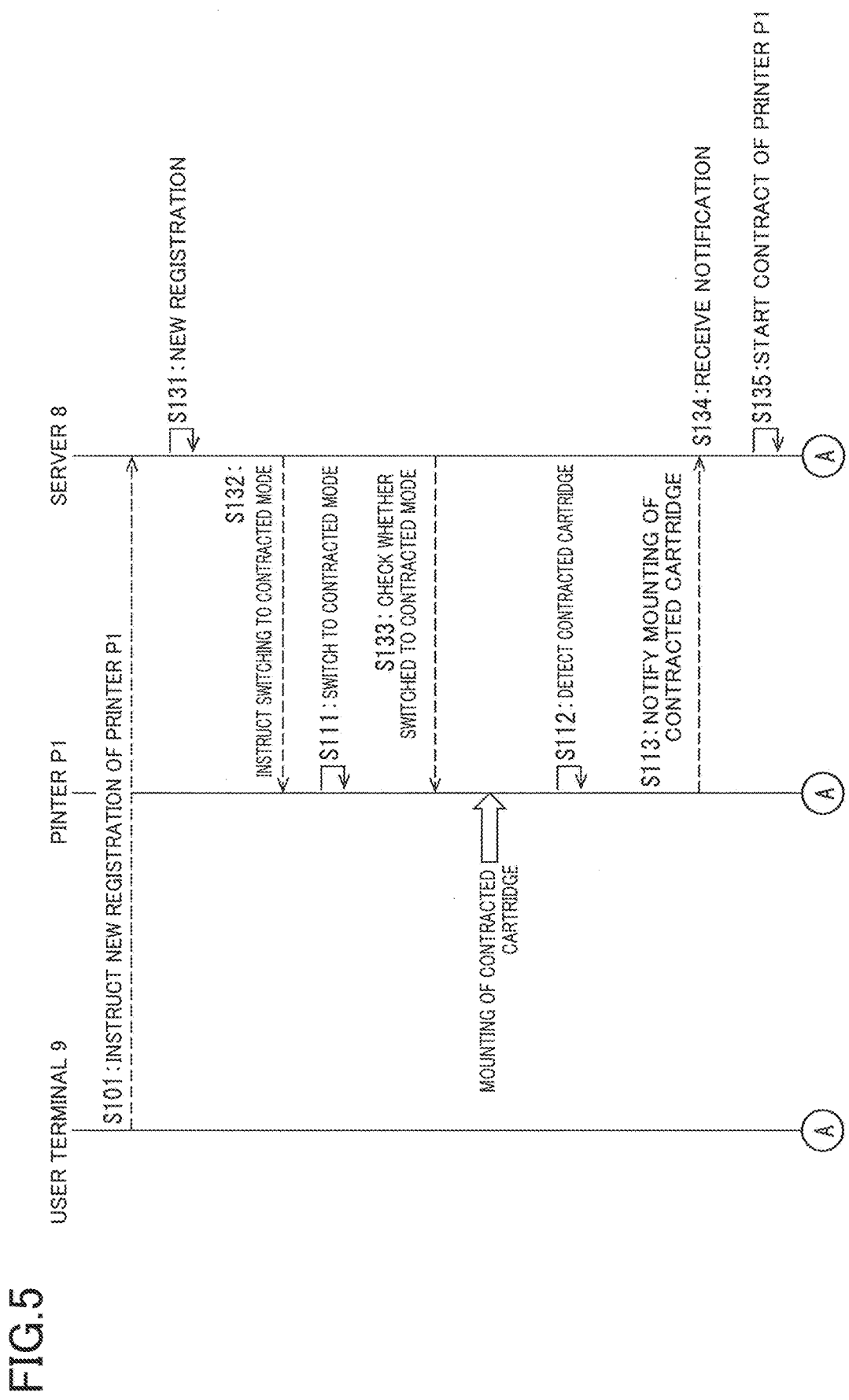
FIG. 5 is a sequence diagram illustrating an operation example of various devices in conducting a new contract in the image forming system according to the first embodiment of the present disclosure.

FIG. 5 is a sequence diagram illustrating operations of various devices in concluding a new contract in the image forming system 100. In FIG. 5, examples of the operations are described in a case where the user concludes a new contract to make a printer P1, as an example of the image forming apparatus 1, be the contracted device. It is noted that, in the following description and drawings after FIG. 5, the device ID 622 of the printer P1 is "00000001". Moreover, the user name of the user who operates the user terminal 9 is "the user A".

The user A conducts the input operations with respect to the user terminal 9 to make the printer P1 be the contracted device by concluding the new contract. When the user terminal 9 receives the input operations, the user terminal 9 instructs the server 8 to newly register the printer P1 in the registration table 822 (S101). It is noted that the user name input by the user and the device ID 622 of the printer P1 input by the user or obtained from the printer P1 by the user terminal 9 are included in the instruction for the new registration.

The server controller 81 of the server 8 receives the instruction for the new registration via the server communication unit 83. When the server controller 81 receives the instruction for the new registration, the server controller 81 newly registers the printer P1 in the registration table 822 of the server memory 82 (S131). Specifically, the server controller 81 conducts operations (1) to (4) described below with respect to the registration table 822.

The operation (1) is an operation for adding one record into the registration table 822.

An operation (2) is an operation for storing the user name included the instruction for the new registration into the column of "USER NAME" of the added record. In a case in FIG. 5, "the user A" is stored as the user name.

An operation (3) is an operation for storing the device ID 622 of the printer P1 into the column of "DEVICE ID" of the added record. In the case in FIG. 5, "00000001" is stored as the device ID 622.

The operation (4) is an operation for storing information indicating "not started" into the column of "CONTRACT" of the added record.

FIG. 6 is a diagram illustrating a transition of information in the registration table 822 in FIG. 5. After the process of S131, as illustrated in FIG. 6, one row of a record is added at a top position in the registration table 822. It is noted that the records in FIG. 6 are sorted by the user name due to ease of viewing, however, the position of the added record is not limited to the top position. This can be applied to FIG. 9 which will be described below.

Returns to FIG. 5 and describes the registration table 822. When the server controller 81 has completed the new registration of the printer P1 into the registration table 822, the server controller 81 instructs, via the server communication unit 83, the printer P1 to switch to the contracted mode (S132). The controller 61 of the printer P1 receives the instruction for switching to the contracted mode via the communication unit 63. When the controller 61 receives the instruction for switching to the contracted mode, the controller 61 switches the status of the printer P1 from the not-contracted mode to the contracted mode (S111). That is, the controller 61 rewrites the mode information in the main memory 62 from the not-contracted mode to the contracted mode. By the above described processes, the printer P1 becomes a situation in which the printer P1 can operate as the contracted device.

The server controller 81 of the server 8 checks whether the printer P1 has switched to the contracted mode or not (S133) after the server controller 81 instructs the printer P1 to switch to the contracted mode (after the process of S132). More specifically, for example, the server controller 81 may obtain the mode information 623 of the printer P1 by communicating with the printer P1 at a timing when a predetermined period has passed after the completion of the process of S132. And then, the server controller 81 may determine whether the printer P1 can switch to the contracted mode or not by referring the mode information 623.

The timing of the execution of the process of S133 may be appropriately set in a period from the timing of the execution of the process of S132 to the timing of the execution of the process of S135. When it is determined that the process of S133 is executed and the printer P1 has switched to the contracted mode, the server controller 81 may arrange a delivery to an address of the user of the printer P1 to deliver the contracted cartridge.

Alternatively, the controller 61 of the printer P1 may notify the server 8 that the printer P1 has switched to the contracted mode after the printer P1 has switched to the contracted mode (after the process of S111). Moreover, the server controller 81 of the server 8 may arrange a delivery to the address of the user of the printer P1 to deliver the contracted cartridge when the server controller 81 is notified from the printer P1 that the printer P1 has switched to the contracted mode and the server controller 81 determines that the printer P1 has switched to the contracted mode.

In any of these cases, ways of the arrangement of the contracted cartridge by the server controller 81 are not limited to the above described way. For example, the server controller 81 may transmit a delivery instruction of the contracted cartridge with the identification information of the user A to a delivery server which executes processes of delivering the contracted cartridge.

After that, the controller 61 of the printer P1 detects the ink cartridge 4 mounted on the body housing and identifies the type of the ink cartridge 4 at a predetermined timing. For example, the controller 61 of the printer P1 may execute the detecting process of the ink cartridge 4 based on a situation in which the cover of the body housing is closed or a situation in which the printer P1 is turned on, as a trigger. It is noted that the controller 61 can identify the type of each of the ink cartridges 4 by detecting the mount of each of the ink cartridges 4 first and referring the cartridge type 422 in the cartridge memory 42 of each of the ink cartridges 4.

In a case where the ink cartridge 4 detected by the controller 61 is the contracted cartridge, the controller 61 notifies the server 8 of the mount of the contracted cartridge. In an example in FIG. 5, the contracted cartridge is mounted on the printer P1 by the user. In this case, the controller 61 detects the mounted contracted cartridge (S112). And then, the controller 61 notifies the server 8 of the mount of the contracted cartridge (S113). The notification transmitted by the controller 61 at S113 includes the device ID 622 of the printer P1.

The server controller 81 of the server 8 receives the notification from the printer P1 via the server communication unit 83 (S134). The server controller 81 checks whether the image forming apparatus 1 which is the pre-switched device is set to the printer P1 in the registration table 822 by querying the registration table 822 as a key that is the device ID 622 of the printer P1 included in the notification to find the record.

In the example in FIG. 5, since the printer P1 is a printer for a new contract, information of the image forming apparatus 1 which is pre-switched device corresponding to the printer P1 is not set in the column of "PRE-SWITCHED DEVICE" in the registration table 822. In this case, as illustrated in the second table in FIG. 6, the server controller 81 rewrites the column of "CONTRACT" of the record corresponding to the printer P1 in the registration table 822 to information indicating "already started". Due to the rewriting of the record, the server controller 81 can start a contract of the printer P1 on the server 8 (S135).

It is noted that the printer P1 on which the four ink cartridges 4 can be mounted. When the controller 61 detects any one contracted cartridge, the controller 61 may execute the process of S113. In this case, the controller 61 does not transmit the notification to be transmitted at S113 to the server 8 in a case where all of the four ink cartridges 4 are the commercial cartridges.

Moreover, the controller 61 may execute the process of S113 in a case where all of the four ink cartridges 4 are the contracted cartridges. In this case, the controller 61 does not transmit the notification to be transmitted at S113 to the server 8 in a case where the controller 61 detects any one commercial cartridge in the four ink cartridge 4.

Processes in Case where Image Forming Apparatus as Pre-Switched Device is Set

Figure 7A:
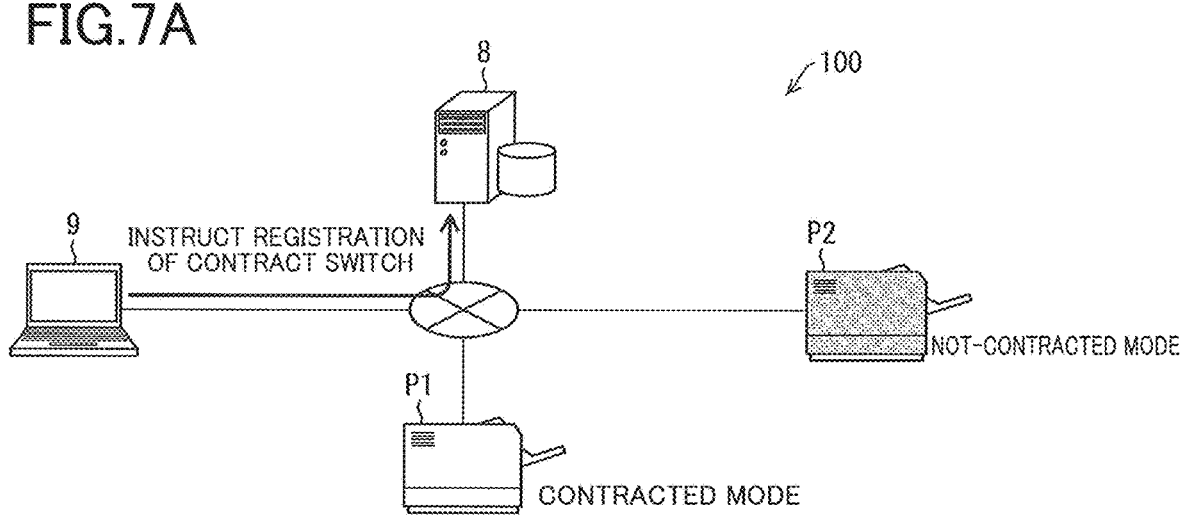
FIG. 7A is a diagram illustrating an outline of processes in switching the contract in the image forming system according to the first embodiment of the present disclosure.
Figure 7B:
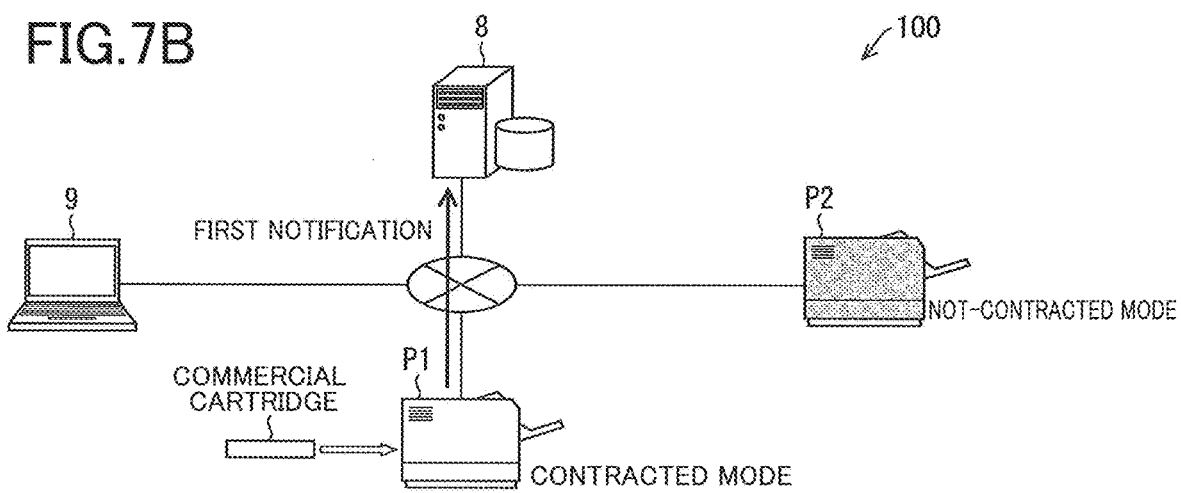
FIG. 7B is a diagram illustrating the outline of processes in switching the contract in the image forming system.
Figure 7C:
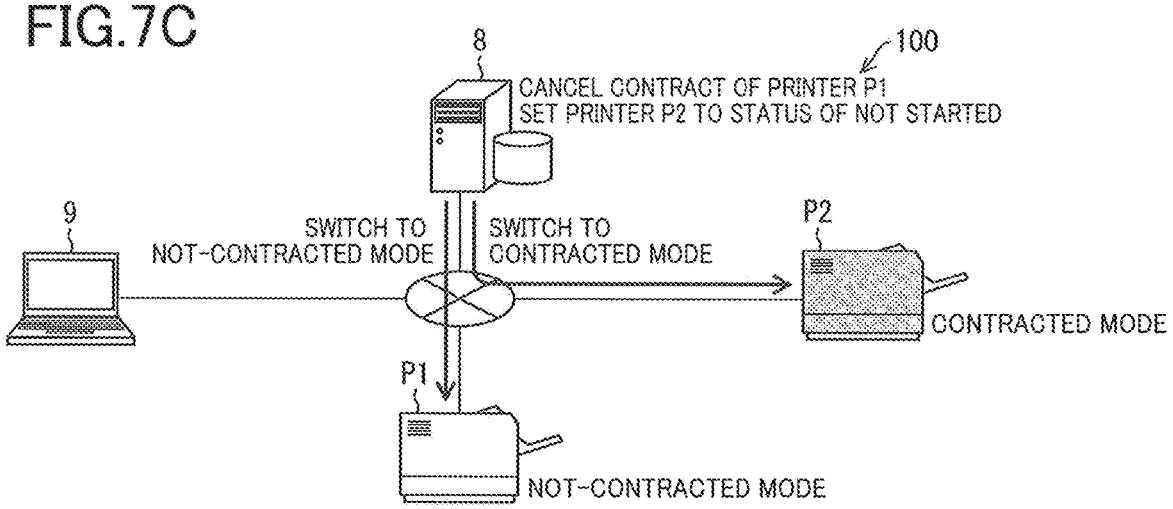
FIG. 7C is a diagram illustrating the outline of processes in switching the contract in the image forming system.
Figure 8:
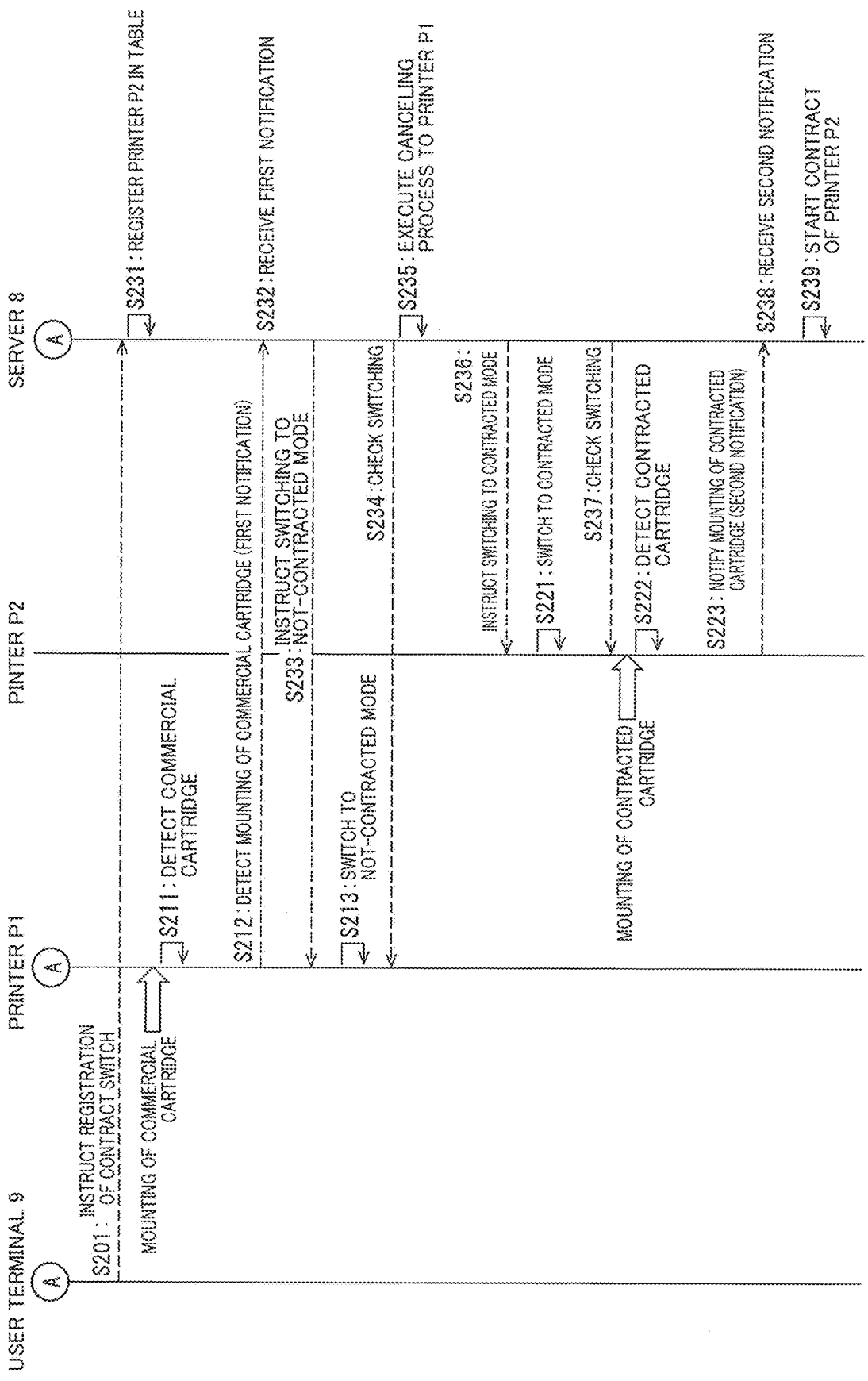
FIG. 8 is a sequence diagram illustrating an operation example in switching the contract in the image forming system according to the first embodiment of the present disclosure.

Next, there will be a case where the printer P1 is set as the image forming apparatus 1 which is the pre-switched device when a printer P2 which is the image forming apparatus 1 different from the printer P1 is registered as the contracted device by referring to FIG. 7 to FIG. 9. That is, in an example in FIG. 7 to FIG. 9, the printer P1 is the image forming apparatus 1 which is the pre-switched device, and the printer P2 is the image forming apparatus 1 which is the post-switched device.

FIG. 7 is a diagram illustrating an outline of processes in switching the contract in the image forming system 100. FIG. 8 is a sequence diagram illustrating an operation example of various apparatuses in switching the contract in the image forming system 100. It is noted that FIG. 8 illustrates the operation example executed after the completion of a series of processes in FIG. 5. That is, situations of the user terminal 9, the printer P1 and the server 8 in FIG. 8 are situations at a timing when the series of processes in FIG. 5 are completed. It is noted that the device ID 622 of the printer P2 is "00000002". FIG. 9 is a diagram illustrating a transition of information in the registration table 822 in FIG. 8.

The user (the user A in this example) conducts the input operations for switching the contract of the printer P1 with respect to the user terminal 9. The input operations for switching the contract can include, for example, the input operations for designating the image forming apparatus 1 which is the pre-switched device, the input operations for designating the image forming apparatus 1 which is the post-switched device, and the input operations for designating the identification information of the user such as the user name.

FIG. 7A illustrates an operation example of the image forming system 100 when the user terminal 9 receives the above described input operations of the user. The user terminal 9 transmits an instruction for registration of switching the contract to the server 8 in accordance with the received input operations (S201 in FIG. 8). The instruction for registration of switching the contract includes the identification information of the image forming apparatus 1 which is the pre-switched device, the identification information of the image forming apparatus 1 which is the post-switched device, and the identification information of the user.

When the server controller 81 of the server 8 receives the instruction for registration of switching the contract, the server controller 81 registers the printer P2 in the registration table 822. When the user terminal 9 receives the input operations, the user terminal 9 instructs the server 8 to newly register the printer P2 and to register the printer P1 that is set as the image forming apparatus 1 which is the pre-switched device (S201). The instruction for the new registration includes the user name, the device ID 622 of the printer P2, and the device ID 622 of the printer P1. Moreover, information indicating that the printer P1 is the image forming apparatus 1 which is the pre-switched device is included in the instruction. The server controller 81 of the server 8 receives the instruction for the new registration via the server communication unit 83.

FIG. 7B illustrates an operation example of the image forming system 100 after the server 8 receives the instruction for registration of switching the contract. When the server controller 81 receives the instruction for the new registration, the server controller 81 registers the printer P2 in the registration table 822 of the server memory 82 (S231 in FIG. 8). The process executed at S231 is an example of a storing step of storing contract-related-information into a storage. Specifically, the server controller 81 conducts the following an operation (1) to an operation (5) with respect to the registration table 822.

The operation (1) is an operation of adding one record into the registration table 822. An operation (2) is an operation of storing the user name included in the instruction for registration of switching the contract into the column of "USER NAME" of the added record. An operation (3) is an operation of storing the device ID 622 of the printer P2 into the column of "DEVICE ID" of the added record. An operation (4) is an operation of storing information indicating "not started" into the column of "CONTRACT" of the added record. The operation (5) is an operation of storing the device ID 622 of the printer P1 into the column of "PRE-SWITCHED DEVICE" of the added record. By storing the information of the operations (1) to (5) into the registration table 822, the printer P2 and the printer P1 are registered in the registration table 822 in a state in which the printer P2 is associated with the printer P1 that is the image forming apparatus 1 which is the pre-switched device that is a previous printer before the printer P2. After the process of S231, as illustrated by the first record in the registration table 822 in FIG. 9, one row record is added in a top position in the registration table 822.

Regarding the processes of S201 and S231, the user mounts the commercial cartridge on the printer P1 that is the image forming apparatus 1 which is the pre-switched device at an appropriate timing after the input operations to the user terminal 9. The printer P1 execute a mount-detecting step of detecting mounting the cartridge on the body housing of the printer P1 at an appropriate timing. The printer P1 further executes a determining process of determining the type of the detected cartridge (S211 in FIG. 8). For example, the controller 61 of the printer P1 may execute the mount-detecting step of detecting the ink cartridge 4 based on, as a trigger, a situation in which the cover of the body housing is closed or the printer P1 is turned on.

When the printer P1 detects the commercial cartridge, the printer P1 transmits, to the server 8, a notification (a first notification) indicating that the commercial cartridge is mounted on the printer P1 (S212 in FIG. 8). The process of S212 is an example of a transmitting step and a transmitting process.

Though described in details below, the first notification triggers that the server 8 permits the printer P2 to use the contracted cartridge. Accordingly, the first notification transmitted from the printer P1 is a notification of permitting the printer P2 associated with the printer P1 in the registration table 822 to use the contracted cartridge.

FIG. 7C illustrates an operation example of the image forming system 100 after the server 8 receives the first notification. The process of S232 is an example of a first receiving step and a first receiving process. When the server 8 receives the first notification (S232 in FIG. 8), the server 8 identifies the printer P1 that is the image forming apparatus 1 which is the pre-switched device, and executes a canceling process of the contract with respect to the printer P1 (S235 in FIG. 8). Here, the canceling process indicates a process in which the server 8 directly or indirectly cancels the contract of the printer P1. The process of S235 is an example of a cancelation-executing step and a cancelation-executing process.

For example, the server controller 81 of the server 8 queries the column of "DEVICE ID" in the registration table 822 to find the record storing the device ID 622 of the printer P1 from which the first notification is transmitted. When the server controller 81 finds the record storing the device ID 622 of the printer P1, the server controller 81 switches the column of "CONTRACT" of the record to "invalid". As a result, as illustrated by the second record from the top in the registration table 822 in FIG. 9, the contracted service is canceled in the printer P1.

Before or after the process of S235, the server controller 81 instructs the printer P1 to switch to the not-contracted mode (S233 in FIG. 8). The instruction for switching to the not-contracted mode is a canceling notification indicating canceling the contract of the printer P1. The controller 61 of the printer P1 receives the instruction for switching to the not-contracted mode. This is an example of a receiving process. The controller 61 causes the printer P1 to become the not-contracted mode (S213 in FIG. 8). The process of S213 is an example of a prohibiting process. As a result, the controller 61 of the printer P1 prohibits the printer P1 from using the contracted cartridge.

After the server controller 81 of the server 8 instructs the printer P1 to switch to the not-contracted mode (after the process of S233), the server controller 81 checks whether the printer P1 has switched to the not-contracted mode or not (S234 in FIG. 8), by the same process executed at S133 in FIG. 5. It is noted that the processes of S233, S213, and S234 may be executed before or after the canceling process of S235.

When the above described processes have completed, the server controller 81 of the server 8 instructs the printer P2 to switch to the contracted mode (S236 in FIG. 8). The instruction for switching to the contracted mode is an example of a permitting step and a permitting process. The image forming apparatus 1 can use the contracted cartridge by switching to the contracted mode. Accordingly, the instruction for switching the mode of the printer P2 from the not-contracted mode to the contracted mode is an instruction in which the server 8 permits the printer P2 to use the contracted cartridge.

When the controller 61 of the printer P2 receives the instruction, the controller 61 switches the mode of the printer P2 to the contracted mode (S221 in FIG. 8). After the server controller 81 of the server 8 instructs the printer P2 to switch to the contracted mode (after the process of S236), the server controller 81 checks whether the printer P2 has switched to the contracted mode or not (S237 in FIG. 8), by the same process executed at S133. When the process of S237 is executed and it is determined that the printer P2 has switched to the contracted mode, the server controller 81 may arrange a delivery to an address of the user of the printer P2 to deliver the contracted cartridge.

Alternatively, the controller 61 of the printer P2 may notify the server 8 that the printer P2 has switched to the contracted mode after the printer P2 has switched to the contracted mode (after the process of S211). Moreover, the server controller 81 of the server 8 may arrange a delivery to the address of the user of the printer P2 to deliver the contracted cartridge when the server controller 81 is notified from the printer P2 that the printer P2 has switched to the contracted mode and the server controller 81 determines that the printer P1 has switched to the contracted mode. In any of these cases, ways of the arrangement of the contracted cartridge by the server controller 81 are not limited to the above described way.

After that, the controller 61 of the printer P2 executes the detecting process of detecting the ink cartridge 4 mounted on the body housing at a predetermined timing (S222 n FIG. 8). For example, the controller 61 of the printer P2 may execute the detecting process of the ink cartridge 4 based on a situation in which the cover of the body housing is closed or a situation in which the printer P2 is turned on, as a trigger.

In a case where the controller 61 detects the ink cartridge 4, the controller 61 further identifies the type of the detected ink cartridge 4. For example, the controller 61 accesses the cartridge memory 42 of the detected ink cartridge 4, and refers the cartridge type 422 of the ink cartridge 4. As a result of this, the controller 61 can identify the type of the ink cartridge 4.

In a case where the ink cartridge 4 detected by the controller 61 is the contracted cartridge, the controller 61 transmits, to the server 8, a second notification indicating that the contracted cartridge is mounted on (S233 in FIG. 8). The second notification includes the device ID 622 of the printer P2.

The server controller 81 of the server 8 receives the second notification via the server communication unit 83 (S238 in FIG. 8). The process of S238 is an example of a second receiving step. When the server 8 receives the second notification, the server controller 81 executes a starting process of staring the contract of the printer P2. The starting process is a process in which the server 8 directly or indirectly starts the contract of the printer P2.

For example, the server controller 81 queries the registration table 822 as a key that is the device ID 622 of the printer P2 included in the second notification to find the record. And then, the server controller 81 rewrites the column "CONTRACT" of the record into "already started". As a result of this, as illustrated by the third record from the top in the registration table 822, the server controller 81 can start the contract of the printer P2 (S239 in FIG. 8). The process of S239 is an example of a start-executing step.

In the example in FIG. 7 to FIG. 9, the server 8 cancels the contract of the printer P1 itself by rewriting the registration table 822. In the present embodiment, however, the server 8 may instruct another information processing apparatus different from the server 8 to cancel the contract of the printer P1. In this case, said instructed another information processing apparatus may cancel the contract of the printer P1 by rewriting the registration table 822. The process in which said another information processing apparatus cancels the contract of the printer P1 is an example of a canceling step. Said another information processing apparatus is, for example, a dedicated purpose server configured to manage contracts, and the like.

Moreover, in the example in FIG. 7 to FIG. 9, the server 8 starts the contract of the printer P2 itself by rewriting the registration table 822. In the present embodiment, however, the server 8 may instruct another information processing apparatus different from the server 8 to start the contract of the printer P2. In this case, said instructed another information processing apparatus may start the contract of the printer P2 by rewriting the registration table 822. The process in which said another information processing apparatus starts the contract of the printer P2 is an example of a starting step.

According to the operations of the image forming system 100 in FIG. 7 to FIG. 9, the contract of the printer P1 is canceled based on, as a trigger, a situation in which the commercial cartridge is mounted on the printer P1. Moreover, the printer P2 is permitted to use the contracted cartridge based on, as a trigger, a situation in which the commercial cartridge is mounted on the printer P1. Accordingly, it is possible to reduce works of the user to cancel the contract. Further, it is possible to eliminate a period in which both of the printer P1 and the printer P2 can use the contracted cartridge, that is, a period of a double contract.

It is noted that it is to be preferable that the printer P1 transmits the first notification in a case where the enough number of the ink cartridges 4 are mounted on the printer P1, that is, the four colors of four ink cartridges 4 are mounted on the printer P1, and all of the four ink cartridges 4 are the commercial cartridges. As a result of this, since the printer P1 can execute the normal printing at a timing when the contract of the printer P1 is canceled, it is possible to prevent the possibility that the printer P1 cannot execute printing due to the cancelation of the contract of P1. Further, it is possible to eliminate a period in which both of the printer P1 and the printer P2 cannot execute printing.

It is noted that in a case where the printer P1 is a monochrome printer on which the ink cartridge 4 which is one ink cartridge containing a certain color of ink or toner can be mounted, the printer P1 may transmit the first notification when it is determined that the one ink cartridge 4 is the commercial cartridge. The monochrome printer can execute the normal printing by mounting the one commercial cartridge. Accordingly, by transmitting the first notification at the above described timing, it is possible to prevent the possibility that the printer P1 cannot execute printing at the timing when the contract of the printer P1 is canceled.

The mode information 623 stored in the main memory 62 of the image forming apparatus 1 may include information indicating whether a charge of the contract of the image forming apparatus 1 has been started or not. For example, the mode information 623 may indicate one of three status including a status (1) which is a status in which the image forming apparatus 1 is in the not-contracted mode, a status (2) which is a status in which the image forming apparatus 1 is in the contracted mode and before a start of the contract, and a status (3) which is a status in which the image forming apparatus 1 is in the contracted mode and after the start of the contract. In a case where the mode information 623 includes the information indicating whether the charge of the contact has been started, the controller 61 may appropriately obtain information indicating an applied status of the contract of the image forming apparatus 1 from the server 8 via the communication unit 63, and renew the mode information 623.

Second Embodiment

There will be described below another embodiment of the present disclosure. It is noted that the same reference numerals as used in the above described embodiment are used to designate the corresponding elements having the same function of the second embodiment, and an explanation of which is dispensed with.

In the image forming system 100 of the first embodiment, in a case where the switch of the contract is executed, a series of processes of canceling the contract of the image forming apparatus 1 which is the pre-switched device and a series of processes of starting the contract of the image forming apparatus 1 which is the post-switched device may be executed in any order or executed in parallel. Specifically, the processes of S233 to S235, S213 in FIG. 8 and the processes of S236 to S239, S211 to S223 in FIG. 8 may be executed in any order or executed in parallel.

There will be described below the image forming apparatus 1 which is the pre-switched device as the printer P1 and the image forming apparatus 1 which is the post-switched device as the printer P2, as similar to FIG. 7 to FIG. 9. Moreover, in the present embodiment, there will be described a case where a series of processes of starting the contract of the printer P2 are executed before a series of processes of canceling the contract of the printer P1.

When the server 8 receives the second notification from the printer P2, the server 8 transmits a request to the printer P1 for detecting the remaining amounts of ink of the ink cartridges 4 which are mounted on the printer P1 (since the contract is not canceled, the ink cartridges 4 which are the contracted cartridge are still mounted). When the controller 61 of the printer P1 receives the request for detecting the remaining-amount of ink, the controller 61 detects the remaining-amount of ink of each of the contracted cartridges by referring the remaining-amount information 423 in the cartridge memory 42 of each of the contracted cartridges. The controller 61 further determines whether the remaining-amounts of ink of all of the contracted cartridges are empty or not.

When the remaining-amounts of ink of all of the contracted cartridges are empty, the controller 61 of the printer P1 transmits, to the server 8, an empty notification which is a notification indicating that all of the contracted cartridges are empty. When the server 8 receives the empty notification, the server 8 starts the canceling process with respect to the printer P1. And then, a series of processes of starting a contract of the printer P2 are executed in the printer P2 and the server 8.

On the other hand, when at least one contracted cartridge, which is not empty, of the contracted cartridges mounted on the printer P1 exists, the controller 61 of the printer P1 recommends the user to use up the remaining ink in the at least one contracted cartridge. Methods of the recommendation are not particularly limited, for example, an image for recommending the user to use up the remaining ink of the at least one contracted cartridge may be displayed on a display. It is noted that, at this time, the printer P1 may be configured that the user can determine via an input unit whether the user uses up the remaining ink in the contracted cartridges or not. And then, when the user determines that the user does not use up the remaining ink in the at least one contracted cartridge, the printer P1 may transmit the empty notification to the server 8, as similar to a case where the remaining ink of all of the contracted cartridges is used up by the user. Processes after the transmission of the empty notification are the same as the case where the remaining-amounts of ink of all of the contracted cartridges become empty.

On the other hand, when the user determines that the user uses up the remaining ink in the contracted cartridges, the printer P1 may monitor the remaining-amounts of ink of the contracted cartridges after notifying the user that the printer P2 cannot be mounted the contracted cartridge yet. And then, when all of the remaining-amounts of the contracted cartridges become empty in the middle of the monitoring, the printer P1 may transmit the empty notification to the server 8. Processes after the transmission of the empty notification are the same as the case where the remaining-amounts of ink of all of the contracted cartridges become empty.

It is noted that a method for using up the remaining ink in the ink cartridge 4 used in the printer P1 may be adopted by focusing on a subscription fee of the contracted service of the printer P1 and the subscription fee of the contracted service of the printer P2. For example, in a case where a monthly subscription fee of the contracted service of the printer P2 is higher than a monthly subscription fee of the contracted service of the printer P1, the printer P1 may be permitted to use the contracted cartridge, by the monthly subscription fee of the contracted service of the printer P1, in a period until use of the contracted cartridge will be permitted in the printer P2. On the other hand, in a case where the monthly subscription fee of the contracted service of the printer P2 is lower than the monthly subscription fee of the contracted service of the printer P1, the printer P1 may be permitted to use the contracted cartridge, by the monthly subscription fee of the contracted service of the printer P2, in the period until use of the contracted cartridge will be permitted in the printer P2.

Modification

First Modification: Type of Image Forming Apparatus

The image forming apparatus 1 may be a laser printer on which a toner cartridge and a drum cartridge, or a combined cartridge combined by the toner cartridge and the drum cartridge can be mounted. In a case where the image forming apparatus 1 is the laser printer, the toner cartridge and the drum cartridge are mounted on the image forming apparatus 1, not the ink cartridge 4. It is noted that the number of the toner cartridges and the number of the drum cartridges mounted on the image forming apparatus 1 are not limited particularly. For example, in a case where the image forming apparatus 1 is a monochrome laser printer, one toner cartridge and one drum cartridge are mounted on the image forming apparatus 1. Moreover, for example, in a case where the image forming apparatus 1 is a color laser printer, a plurality of toner cartridges and a plurality of drum cartridges each corresponding to a corresponding one of the plurality of toner cartridge are mounted on the image forming apparatus 1.

The image forming apparatus 1 stores the same information as the information of the ink cartridge 4 described in the first embodiment in the toner cartridge and/or the drum cartridge. And then, the controller 61 of the image forming apparatus 1 may determine whether the toner cartridge and/or the drum cartridge is/are the contracted cartridge or the commercial cartridge by reading types of the cartridge from the toner cartridge and/or the drum cartridge.

Moreover, the image forming apparatus 1 may be a MFP (MultiFunction Peripheral) including other functions such as a scanner function and a facsimile function. Even in a case where the image forming apparatus 1 is the MFP, the image forming apparatus 1 may execute the processes described in the first embodiment and the second embodiment by the same manner of the image forming apparatus 1 in the first embodiment and the second embodiment.

Second Modification: Types of Printing Base Material

In the first embodiment and the second embodiment, the recording sheet P is a paper medium. However, a printing base material of the image forming apparatus 1 is not limited to paper. For example, the printing base material may be a resin material such as an OHP (Overhead Projector) sheet. Moreover, for example, the printing base material may be a tape. In a case where the printing base material is the tape, a tape cassette configured to supply the tape is mounted on the image forming apparatus 1. The image forming apparatus 1 prints on the tape conveyed from the tape cassette. It is noted that, in this case, the image forming apparatus 1 may be a laser printer or an ink jet printer.

Third Modification: Type of Contract

In the description above, there has been described a case where the mode of the image forming apparatus 1 includes the contracted mode and the not-contracted mode. However, types of the mode and the number of the mode of the image forming apparatus 1 are not limited to the example described in the first embodiment and the second embodiment. For example, suppose that the image forming apparatus 1 can be concluded two types of contracts. In this case, there may be three types of modes, "a not-contracted mode" that is a mode in which any one of the two types of contracts of the image forming apparatus 1 do not become valid, "a first contract mode" that is a mode in which a contracted printing corresponding to a first contract of the two types of contracts is available, and "a second contract mode" that is a mode in which a contracted printing corresponding to a second contract of the two types of contracts is available. Similarly, in a case where the number of the types of contracts increases, the number of the types of the modes of the contracts may increase. Like this, in a case where there are a plurality of types of contracts, the cancelation of the contract in the first embodiment and the second embodiment indicates a cancelation of any one of the plurality of types of contracts. Moreover, the switch of the contract indicates that the contract of the image forming apparatus 1 which is the contracted device based on any one of the plurality of types of contracts is canceled, and another image forming apparatus 1 becomes the contracted device based on a contract which is the same type of the contract as the canceled type of the contract. Moreover, in this case, the mode of the contract in the first embodiment and the second embodiment may indicate any one of the plurality of mode of the contracts such as the above described first contract mode and the above described second contract mode.

Moreover, the type of the contracted printing is not limited to the fixed price printing service. For example, in a case where the mode of the contract is the first contracted mode, and the status is that the charge of the contract has been started, the fixed price printing service may be available, and in a case where the mode of the contract is the second contracted mode, and the status is that the charge of the contract has been started, a fixed quantity printing service which permits the user to print within a predetermined amount of printing may be available. Like this, in a case where there are the plurality of types of the contracted printings, it is preferable that the controller 61 permits the user to use the contracted printing, the type of which corresponding to the contracted mode which becomes valid. It is noted that even in a case where any contracted printing becomes valid, and only the commercial cartridges are mounted on the image forming apparatus 1, each time, the normal printing may be available.

Embodiment By Software

Functions of the image forming apparatus 1 (which will be referred as the device) can be achieved by a program which causes a computer to function as the device and causes the computer to function as each of control blocks of the device.

In this case, the above described device includes the computer, as a hardware configured to execute the above described program, having at least one control device (for example, a processor) and at least one storage (for example, a memory). Each of the functions described in each of the embodiments are achieved by performing the program by the control device and the storage.

The above described program may be stored in one or a plurality of computer-readable storage medium which does not temporarily stores the program, that is, tangibly stores the program. The storage medium may be included in the device, or may not be included in the device. In the latter case, the above described program may be supplied to the device via an arbitrary wired or wireless transmission medium.

Moreover, a part or an entire of each of the control blocks can be embodied by logic circuits. For example, integrated circuits in which the logic circuits respectively function as the control blocks are formed also included in the scope of the present disclosure. Alternatively, for example, the functions of the control blocks can be achieved by quantum computers.

The present disclosure is not limited to the above described embodiments, and the disclosure may be otherwise embodied with various modifications without departing from the scope and spirit of the disclosure. Embodiments achieved by appropriately combining technical features disclosed in different embodiments can be included in the technical scope of the present disclosure.

What is claimed is:

1. A method, comprising:
causing an information processing apparatus to receive, from a first image forming apparatus, a first notification indicating that cartridge has been detected as being mounted on the first image forming apparatus and has been identified as a non-contracted cartridge as opposed to a contracted cartridge, the contracted cartridge being a cartridge which is permitted to be used based on a concluded contract;
causing the information processing apparatus to execute a canceling process of canceling the contract of the first image forming apparatus when the information processing apparatus receives the first notification; and
causing the information processing apparatus to permit a second image forming apparatus corresponding to the first image forming apparatus to use the contracted cartridge when the information processing apparatus receives the first notification.

2. The method according to claim 1,
wherein the non-contracted cartridge can be used regardless of whether the contract was concluded or not.

3. The method according to claim 1
wherein the canceling process is a process in which the information processing apparatus cancels the contract of the first image forming apparatus.

4. The method according to claim 1,
wherein the canceling process is a process in which the information processing apparatus instructs another information processing apparatus to cancel the contract of the first image forming apparatus, and
wherein the method further comprises causing said another information processing apparatus to cancel the contract of the first image forming apparatus.

5. The method according to claim 1, further comprising storing contract-related-information which is information associating the first image forming apparatus with the second information forming apparatus into a storage,
wherein the second image forming apparatus indicated by the contracted-related-information stored in the storage is permitted to use the contracted cartridge after permission.

6. The method according to claim 1, further comprising:
causing the information processing apparatus to receive, from the second image forming apparatus, a second notification indicating that a cartridge has been detected as being mounted on the second image forming apparatus and has been identified as the contracted cartridge; and
causing the information processing apparatus to execute a starting process of starting the contract of the second image forming apparatus when the information processing apparatus receives the second notification.

7. The method according to claim 6,
wherein the starting process is a process in which the information processing apparatus starts the contract of the second image forming apparatus.

8. The method according to claim 6,
wherein the starting process is a process in which the information processing apparatus instructs another information processing apparatus to start the contract of the second image forming apparatus, and wherein the method further comprises causing said another information apparatus to start the contract of the second image forming apparatus.

9. The method according to claim 1, wherein the first image forming apparatus is a monochrome printer on which one cartridge containing one color ink or one color toner can be mounted, and wherein the method further comprises causing the first image forming apparatus to transmit the first notification to the information processing apparatus in a case where the cartridge is detected as being mounted on the first image forming apparatus and identified as the non-contracted cartridge.

10. The method according to claim 1, wherein the first image forming apparatus is a color printer on which a plurality of cartridges containing a plurality of colors of ink or a plurality of colors of toner can be mounted, and wherein the method further comprises causing the first image forming apparatus to transmit the first notification to the information processing apparatus in a case where all of the plurality of cartridges is detected as being mounted on the first image forming apparatus and identified as the non-contracted cartridges.

11. The method according to claim 9, wherein the first image forming apparatus includes a cover movable between an open position at which the cover opens an opening of a body housing of the first image forming apparatus and a close position at which the cover close the opening, and wherein the method further comprises causing the first image forming apparatus to detect mounting of the cartridge on the body housing when the first image forming apparatus is turned on or the opening is closed by the cover.

12. An image forming apparatus permitted to use a contracted cartridge, comprising:
a body housing; and
a controller configured to execute:
detecting whether a cartridge is mounted on the body housing and identifying whether the detected cartridge is a non-contracted cartridge or the contracted cartridge;
in response to identifying the non-contracted cartridge being mounted, transmitting, to an information processing apparatus, a notification indicating that the non-contracted cartridge has been identified as being mounted on the first image forming apparatus and permitting a second image forming apparatus corresponding to the first image forming apparatus to use the contracted cartridge;
receiving a cancelation notification, in response to the notification, indicating a cancelation of the contract of the first image forming apparatus; and
prohibiting the first image forming apparatus from using the contracted cartridge when the first image forming apparatus receives the cancelation notification.

13. An information processing apparatus configured to communicate with a first image forming apparatus which is permitted to use a contracted cartridge that can be used based on a concluded contract and a second image forming apparatus corresponding to the first image forming apparatus,
the information processing apparatus comprising a controller configured to execute:
receiving a first notification indicating a cartridge has been detected as being mounted on the first image forming apparatus and identified as a non-contracted cartridge as opposed to the contracted cartridge;
executing a cancelation process of canceling the contract of the first image forming apparatus when the information processing apparatus receives the first notification; and
permitting the second image forming apparatus to use the contracted cartridge when the information processing apparatus receives the first notification.

14. The according to claim 1, wherein the identification is based on cartridge type information stored in the cartridge.

* * * * *